UNITED STATES PATENT OFFICE.

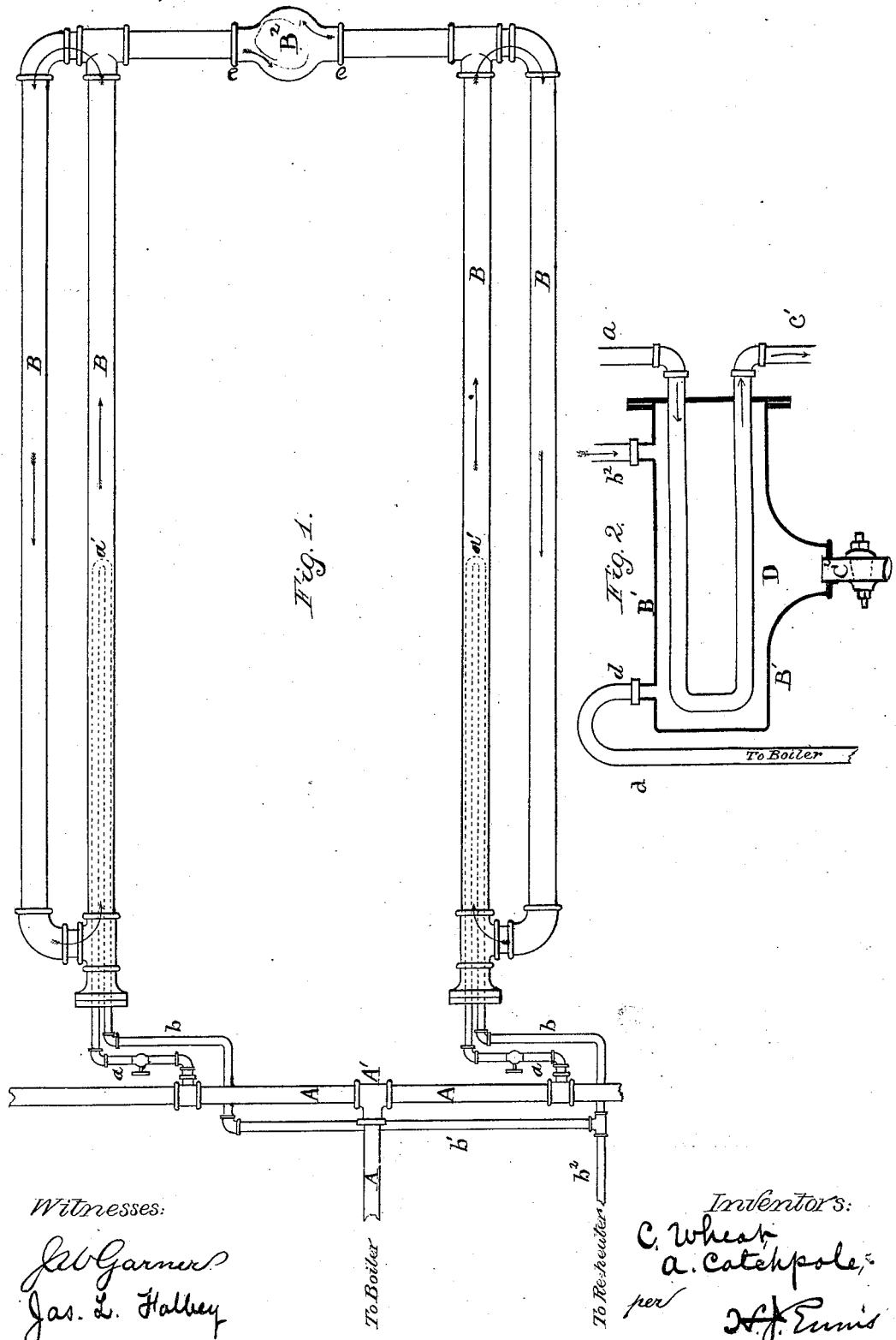

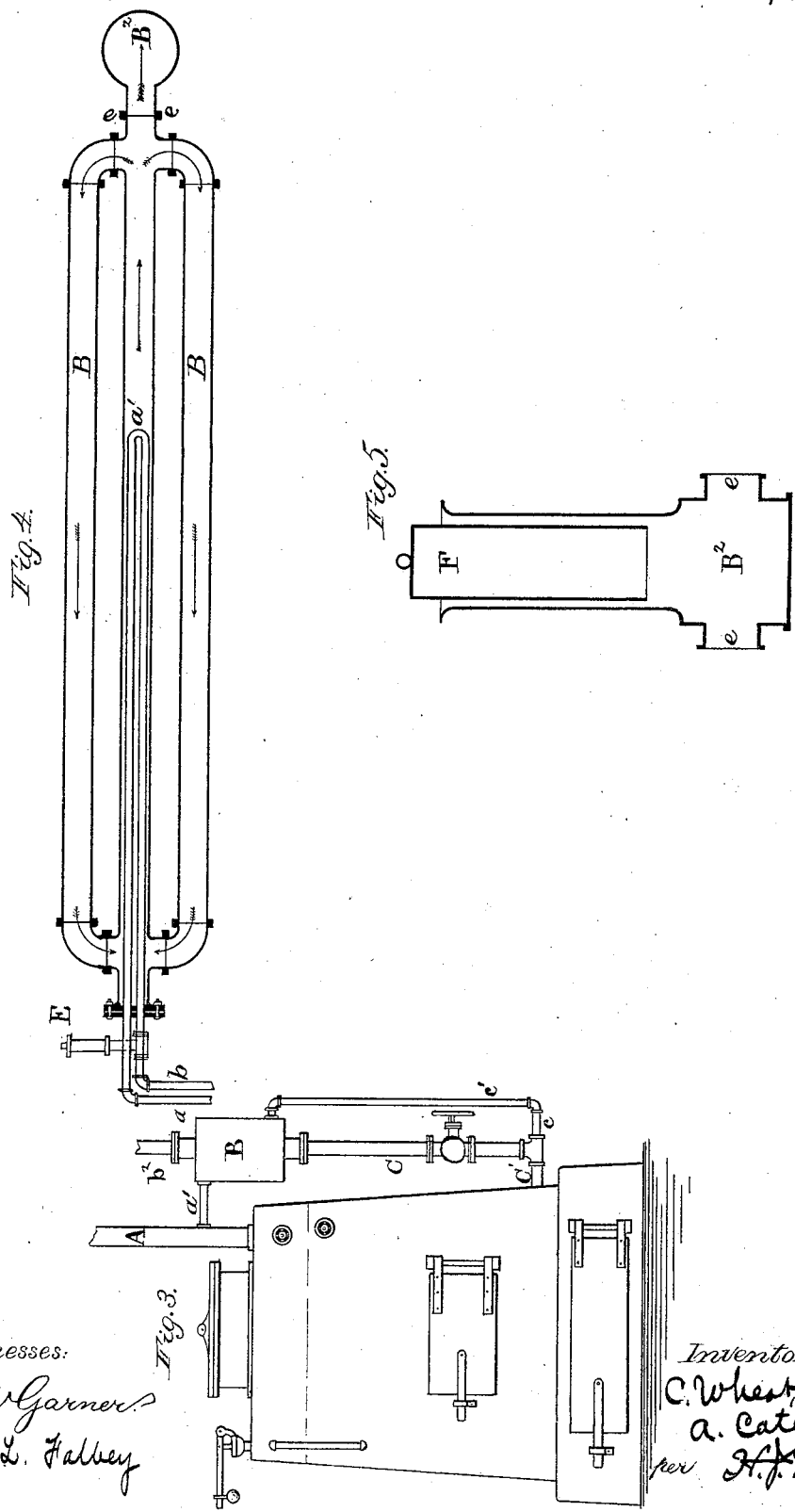

CORYDON WHEAT AND ALFRED CATCHPOLE, OF GENEVA, NEW YORK.

HEATING APPARATUS.

SPECIFICATION forming part of Letters Patent No. 306,707, dated October 14, 1884.

Application filed October 11, 1882. (No model.)

To all whom it may concern:

Be it known that we, CORYDON WHEAT and ALFRED CATCHPOLE, citizens of the United States, residing at Geneva, in the county of Ontario and State of New York, have invented certain new and useful Improvements in Heating Apparatus, of which the following is a specification, reference being had therein to the accompanying drawings.

This invention relates to certain improvements in heating apparatus for greenhouses and other structures; and it consists in a particular combination or system of steam and water pipes, whereby the water is heated and caused to circulate, as more fully hereinafter specified.

In the drawings, Figure 1 is a plan view of the system of steam-pipes leading from the boiler and branching into water-pipes and returning therefrom and the reheating-drum. Fig. 2 is a vertical section of one form of a reheating-drum and apparatus. Fig. 3 represents an elevation of a furnace, showing the connections of the steam and other pipes and a reheater connected to the main steam-pipe and to the boiler. Fig. 4 is a plan view of a system of three pipes for water, the central pipe inclosing the steam-pipe. Fig. 5 is a sectional view of a modification of the expansion-tank forming a portion of my improved system.

In the drawings, the letter A indicates a steam-pipe leading from a boiler. At A' the said pipe, as shown in Fig. 1, branches to the right and left. From suitable couplings smaller pipes $a$ $a$ are led into the water-pipes B. The said pipes $a$ $a$ are carried backward, after being extended a sufficient distance into the pipes B, and pass out of the water-pipes, and are conducted downwardly by branch pipes $b$ $b'$ $b^2$ into the top of a reheating-drum, B', as indicated in Figs. 2 and 3. In Fig. 3 the reheater is connected to the steam-pipe A by a short tube, $a'$, which supplies said reheater with steam. From the bottom of the reheater B' a drip-pipe, C, extends, connecting with a branch pipe, C', from the bottom of the boiler. Another pipe, $c$, extends from the branch pipe C', and a vertical pipe, $c'$, connects with it and with the reheater B' just above the bottom, which pipes $c$ $c'$ conduct down any condensed steam which may be formed in the reheater. Suitable valves are fitted to these steam-pipes to control the course of the steam and water. The steam-pipe passes through one end of the water-pipe, and makes a return, and passes out again at the same end. The condensed steam is admitted by the pipe $b^2$, and passes down to the collection-chamber D at the bottom, being heated by the steam-pipe within the chamber as it passes down. At the bottom of the collection-chamber a pipe, $C^2$, is connected for the purpose of removing any sediment which may accumulate. The pipe $d$ $d$, from the top of the reheater B', is connected with the boiler, for the purpose of reheating the return-pipe $a'$.

The letter B² indicates an expansion-tank, which may be placed at any point of the water-pipes. The said tank is open at the top, and has within it a cylinder, F, closed at the top and open at the bottom, which acts as a float and prevents the evaporation of water and the escape of steam and its condensation on surrounding objects on the discharge of water from said expansion-chamber.

The operation of our invention being set forth in connection with the above description, further reference to it is deemed unnecessary.

We are aware that the steam-pipe has passed entirely through the hot-water pipe from end to end; but this system is objectionable, as it necessitates an extra length of return-pipe, which being exposed, a large amount of heat is lost by radiation.

Having thus described our invention, what we claim, and desire to secure by Letters Patent, is—

The combination, with the system of inclosed hot-water-circulating pipes, of the steam-heating pipes entering and returning through one of said hot-water pipes, and supplied with steam from a reheater connected directly to a steam-generator.

In testimony whereof we affix our signatures in presence of two witnesses.

CORYDON WHEAT.
ALFRED CATCHPOLE.

Witnesses:
E. J. ROGERS,
CLARKSON K. CHIPPS.